US009563085B2

(12) United States Patent
Kang et al.

(10) Patent No.: US 9,563,085 B2
(45) Date of Patent: Feb. 7, 2017

(54) DISPLAY DEVICE (71) Applicant: Samsung Display Co., Ltd., Yongin (KR)

(72) Inventors: Jang-Mi Kang, Yongin (KR); Mee-Hye Jung, Yongin (KR); Cheol-Gon Lee, Yongin (KR); Ii-Gon Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/755,569

(22) Filed: Jun. 30, 2015

(65) Prior Publication Data

US 2016/0116805 A1     Apr. 28, 2016

(30) Foreign Application Priority Data

Oct. 28, 2014   (KR) ........................ 10-2014-0147696

(51) Int. Cl.
*G02F 1/1343*   (2006.01)
*G02F 1/1362*   (2006.01)

(52) U.S. Cl.
CPC ... *G02F 1/134309* (2013.01); *G02F 1/136286* (2013.01); *G02F 2001/134345* (2013.01); *G02F 2001/136218* (2013.01)

(58) Field of Classification Search
CPC .................................................. G02F 1/1343
See application file for complete search history.

(56) References Cited

U.S. PATENT DOCUMENTS

| 9,250,486 | B2* | 2/2016 | Kesho | G02F 1/134363 |
| 2003/0071952 | A1* | 4/2003 | Yoshida | G02F 1/134363 349/141 |
| 2010/0123845 | A1 | 5/2010 | Kim et al. | |
| 2011/0051059 | A1 | 3/2011 | Kang et al. | |
| 2014/0043553 | A1 | 2/2014 | Lo et al. | |
| 2014/0132874 | A1* | 5/2014 | Jang | G02F 1/134309 349/44 |
| 2014/0168582 | A1* | 6/2014 | Chang | G02F 1/134309 349/106 |
| 2014/0267962 | A1* | 9/2014 | Jung | G02F 1/134363 349/33 |

(Continued)

FOREIGN PATENT DOCUMENTS

| KR | 10-2010-0054344 | 5/2010 |
| KR | 10-2011-0024510 | 3/2011 |

*Primary Examiner* — Timothy L Rude
(74) *Attorney, Agent, or Firm* — H.C. Park & Associates, PLC (57) ABSTRACT A display device includes a first substrate including pixel areas, a second substrate including a common electrode, the second substrate facing the first substrate, and a liquid crystal layer disposed between the first substrate and the second substrate, in which the first substrate includes data lines disposed on a side of each pixel area, a first pixel electrode having a hexagonal shape disposed on the pixel areas, a shielding electrode overlapping the data line, the shielding electrode disposed on the same layer as the first pixel electrode, and a second pixel electrode disposed on the first pixel electrode, and a first distance between the shielding electrode and a first side of the first electrode disposed on a first pixel area of the pixel areas is greater than a second distance between a second side of the first electrode and the shielding electrode disposed on a second pixel area of the pixel areas.

20 Claims, 5 Drawing Sheets (56) References Cited

U.S. PATENT DOCUMENTS

| | | | |
|---|---|---|---|
| 2015/0029449 A1* | 1/2015 | Woo | G02F 1/133512 349/110 |
| 2015/0098047 A1* | 4/2015 | Shin | G02F 1/133707 349/106 |
| 2015/0268517 A1* | 9/2015 | Song | G02F 1/134309 349/43 |
| 2015/0331266 A1* | 11/2015 | Kang | H01L 27/1259 257/59 |
| 2016/0116804 A1* | 4/2016 | Kang | G02F 1/134309 349/43 |
| 2016/0209712 A1* | 7/2016 | Lee | G02F 1/134309 |
| 2016/0216543 A1* | 7/2016 | Hong | G02F 1/1368 |

* cited by examiner

DISPLAY DEVICE

CROSS-REFERENCE TO RELATED APPLICATION

This application claims priority from and the benefit of Korean Patent Application No. 10-2014-0147696, filed on Oct. 28, 2014, which is hereby incorporated by reference for all purposes as if fully set forth herein.

BACKGROUND

Field

Exemplary embodiments of the present invention relate to a display device, and more particularly, to a display device with improved display quality.

Discussion of the Background

In a liquid crystal display device, an anisotropic property of liquid crystals may limit a viewing angle of an image implemented and distort the image displayed by the liquid crystal display device. Patterns of a pixel electrode and a common electrode may prevent the image implemented from distortion.

When an electric field is applied to the liquid crystal, a fringe electric field may be generated in an edge area of a pattern electrode that may align liquid crystal molecules in a plurality of directions.

Various modified structures of the pixel electrode have been recently developed to solve the viewing angle problem. However, a modified structure of the pixel electrode for improving a viewing angle may limit a manufacturing process technique, and deteriorate transmissivity of the liquid crystal display device. The deterioration of the transmissivity may cause deterioration of display quality of the liquid crystal display device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a display device with improved display quality.

Additional aspects will be set forth in the detailed description which follows, and, in part, will be apparent from the disclosure, or may be learned by practice of the inventive concept.

An exemplary embodiment of the present invention provides a display device including a first substrate including pixel areas, a second substrate including a common electrode, the second substrate facing the first substrate, and a liquid crystal layer disposed between the first substrate and the second substrate, in which the first substrate includes data lines disposed in a side of each pixel area, a first pixel electrode having a hexagonal shape disposed on the pixel areas, a shielding electrode overlapping the data line, the shielding electrode disposed on the same layer as the first pixel electrode, and a second pixel electrode disposed on the first pixel electrode, and a first distance between the shielding electrode and a first side of the first electrode disposed on a first pixel area of the pixel areas is greater than a second distance between a second side of the first electrode and the shielding electrode disposed on a second pixel area of the pixel areas.

The first distance may be in a rage of 6 μm to 10 μm, and the second distance may be in a range of 4 μm to 8 μm.

A ratio of the first to the second distance may be in a range of 3:2 to 5:4.

A width of the shielding electrode may be greater than a width of the data line.

The first pixel electrode may include an opened part comprising a diamond shape.

The second pixel electrode may include a first sub-pixel electrode overlapping the opened part of the first pixel electrode, and a second sub-pixel electrode spaced apart from outer boundaries of the first sub-pixel electrode, the second sub-pixel electrode comprising a plate shape covering the pixel area.

An edge area of the first sub-pixel electrode may overlap the first pixel electrode.

The first sub-pixel electrode may include a stem part having a cross shape, and first branch parts extending from the stem part, and acute angles formed between the stem part and the first branch parts may be in a range of 35° to 55°.

An edge area formed within the second sub-pixel electrode may overlap the first pixel electrode.

The second sub-pixel electrode may include a circumference part connecting outer corners of the second sub-pixel electrode having the plate shape, and second branch parts extending from the circumference part.

Angles formed between the second branch parts and the circumference part may be in range of 35° to 55°.

An exemplary embodiment of the present invention may provide a display device, including, a first substrate including pixel areas, a second substrate including a common electrode, the second substrate facing the first substrate, and a liquid crystal layer disposed between the first substrate and the second substrate, in which the first substrate includes gate lines disposed on a first base substrate, data lines insulated from and crossing the gate lines, thin-film transistors connected to the gate lines and the data lines, a first passivation layer disposed on the thin-film transistors, a first pixel electrode disposed on the first passivation layer and connected to a first thin-film transistor of the thin-film transistors, a shielding electrode disposed on the first passivation layer and overlapping the data line, the shielding electrode being configured to block an electric field, a second passivation layer disposed to cover the first pixel electrode and the shielding electrode, and a second pixel electrode disposed on the second passivation layer, the second passivation layer including a first sub-pixel electrode overlapping an opened part of the first pixel electrode, and a second sub-pixel electrode disposed at outer boundaries of the first sub-pixel electrode, the second sub-pixel electrode is connected to a second thin-film transistor of the thin-film transistors, and a first distance between the shielding electrode and a first side of the first electrode disposed on a first pixel area of the pixel areas may be greater than a second distance between a second side of the first electrode and the shielding electrode disposed on a second pixel area of the pixel areas.

An exemplary embodiment of the present invention may provide a display device including a first substrate including pixel areas, a second substrate including a common electrode, the second substrate facing the first substrate, and a liquid crystal layer disposed between the first substrate and the second substrate, in which the first substrate may include data lines disposed on a side of each pixel area, a pixel electrode disposed on the pixel area, a first pixel electrode having a hexagonal shape disposed on the pixel areas, a shielding electrode overlapping the data line, the shielding electrode disposed on the same layer as the first pixel electrode, and a second pixel electrode disposed on the first pixel electrode, and a first width and a second width which correspond to portions of the shielding electrode that do not overlap the data line may be configured to be different from each other.

A first portion of the shielding electrode corresponding to the first width may be disposed on a first pixel area of the pixel areas, a second portion of the shielding electrode corresponding to the second width may be disposed on a second pixel area of the pixel areas, and the first width may be greater than the second width.

The first width may be in a range of 2.5 µm to 3.5 µm, and the second width may be in a range of 1.5 µm to 2.5 µm.

A ratio of the first width to the second width may be in a range of 5:3 to 7:5.

A width at which the shielding electrode overlaps the second pixel electrode may be greater than a width of a second electrode overlapping the shielding electrode in the second pixel area of the pixel areas.

An exemplary embodiment of the present invention may provide a display device including a first substrate including pixel areas, a second substrate including a common electrode, the second substrate facing the first substrate, and a liquid crystal layer disposed between the first substrate and the second substrate, in which the first substrate includes gate lines disposed on a first base substrate, data lines insulated from and crossing the gate lines, thin-film transistors connected to the gate lines and the data lines, a first passivation layer disposed on the thin-film transistors, a first pixel electrode disposed on the first passivation layer and connected to a first thin-film transistor of the thin-film transistors, a shielding electrode disposed on the first passivation layer and overlapping the data line, the shielding electrode being configured to block an electric field, a second passivation layer disposed to cover the first pixel electrode and the shielding electrode, and a second pixel electrode disposed on the second passivation layer, the second pixel electrode including a first sub-pixel electrode overlapping an opened part of the first pixel electrode, and a second sub-pixel electrode disposed at outer boundaries of the first sub-pixel electrode, the second sub-pixel electrode is connected to a second thin-film transistor of the thin-film transistors, a width of the shielding electrode is greater than a width of the data line, and a first width and a second width which correspond to portions of the of the shielding electrode that do not overlap the data line may be configured to be different from each other.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
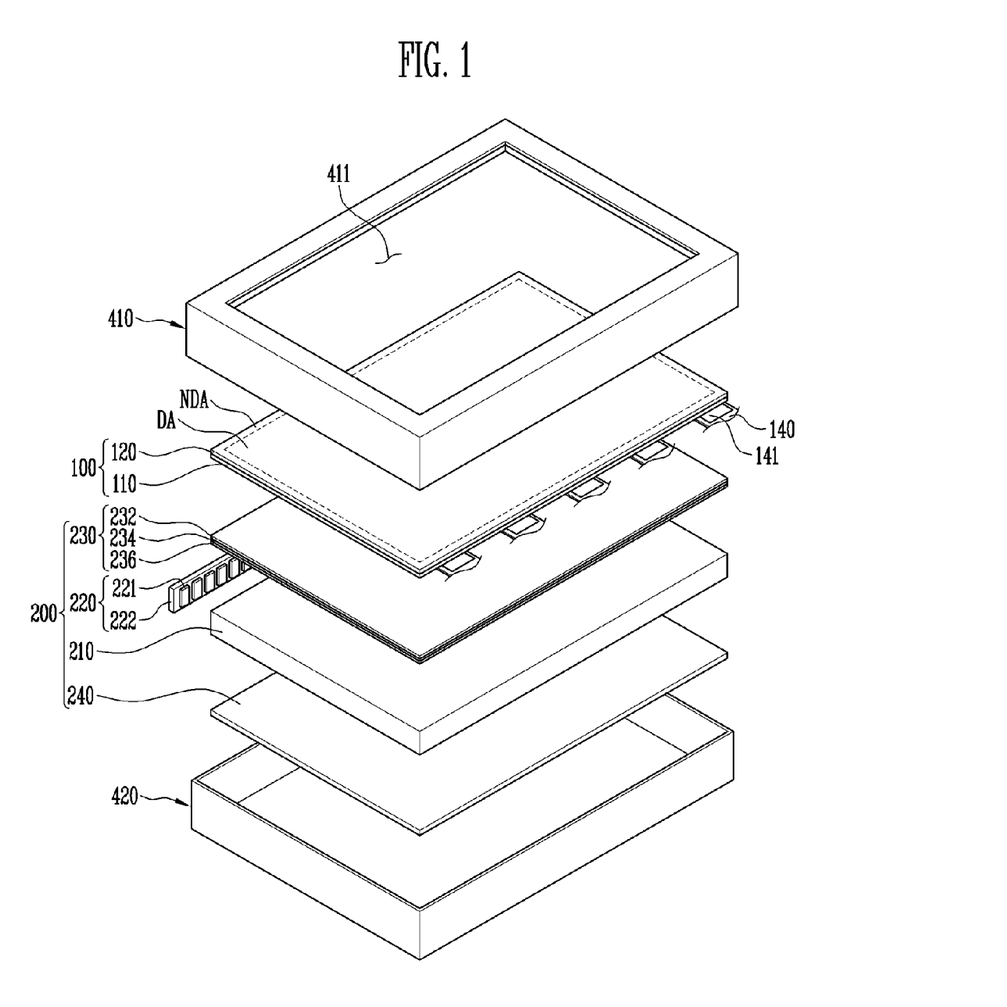
FIG. 1 is a diagram illustrating a display device according to an exemplary embodiment of the present invention.

FIG. 1 is a diagram illustrating a display device according to an exemplary embodiment of the present invention.

Referring to FIG. 1, a display device includes a liquid crystal display panel 100, a backlight unit 200, an upper cover 410, and a lower cover 420.

The liquid crystal display panel 100 may have a rectangular plate shape having a long side and a short side, and include a display area DA for displaying an image, and a non-display area NDA around the display area DA. The liquid crystal display panel 100 may further include a first substrate 110, a second substrate 120 opposite to the first substrate 110, and a liquid crystal layer (not shown) formed between the first substrate 110 and the second substrate 120. A polarizing film (not shown) may be attached to both surfaces of the liquid crystal display panel 100. That is, the polarizing film may be disposed on an outer surface of each of the first substrate 110 and the second substrate 120.

Pixels (not shown) arranged in a matrix form may be disposed on the display area DA of the first substrate 110. Here, each pixel may include sub pixels, and each sub pixel may have a different color. For example, each sub pixel may have any one color of red, green, blue, cyan, magenta, and yellow. Accordingly, light emitted from each sub pixel may have any one color of red, green, blue, cyan, magenta, and yellow. Further, each pixel may include a gate line (not shown), a data line DL (not shown) intersecting and insulated from the gate line, and a pixel electrode (not shown). Further, each pixel may include a thin-film transistor (not shown) electrically connected to the gate line, the data line, and to the corresponding pixel electrode. The thin-film transistor may switch a driving signal provided to the corresponding pixel electrode.

An encapsulation pattern (not shown) for bonding the first substrate 110 and the second substrate 120 may be disposed in the non-display area NDA of the first substrate 110.

A first surface of the second substrate 120 may include a color filter (not shown) configured to implement a predetermined color by using light provided by the backlight unit 200, and a common electrode (not shown) disposed on the color filter to face the pixel electrode (not shown). The color filter may have any one color of red, green, blue, cyan, magenta, and yellow, and may be formed by a process, such as deposition or coating. According to an exemplary embodiment of the present invention, the color filter may be formed on the first substrate 110.

The pixel electrode and the common electrode may apply a voltage to the liquid crystal layer to arrange the liquid crystal layer in a specific direction. The liquid crystal display panel 100 may display an image by adjusting transmittance of the light provided from the backlight unit 200.

A signal input pad (not shown) may be disposed on the external surface of any one of the first substrate 110 and the second substrate 120 in the non-display area NDA. The signal input pad may be connected to a flexible circuit substrate 140, in which a driver IC 141 is embedded, and the flexible circuit substrate 140 may be connected to an external circuit module (not shown). The driver IC 141 may receive various control signals from the external circuit module, and output a driving signal for driving the liquid crystal display panel 100 to the thin-film transistor in response to the input various control signals.

The backlight unit 200 may be disposed on an opposite side of the liquid crystal display panel to which an image is. The backlight unit 200 may include a light wave plate 210, a light source unit 220 including light sources, an optical member 230, and a reflection sheet 240.

The light guide plate 210 may be disposed under the liquid crystal display panel 100, and guide light emitted from the light source unit 220 to emit the light in the direction of the liquid crystal display panel 100. The light guide plate 210 may overlap at least the display area DA of the liquid crystal display panel 100. The light guide plate 210 may include an emission surface through which light is emitted, a lower surface opposite to the emission surface, and lateral surfaces for connecting the emission surface and the lower surface. At least one of the lateral surfaces may be an incident surface opposite to the light source unit 220, and through which light emitted from the light source unit 220 is incident. A lateral surface facing the incident surface may be a light surface that reflects light.

The light source unit 220 may include the light sources 221 by, for example, including a printed circuit board 222 embedded with light emitting diodes.

All of the light sources 221 may emit light having the same color. For example, the light sources 221 may emit white color.

The light sources 221 may emit light having different colors. For example, some of the light sources 221 may emit red light, while the other light sources 221 may emit green light or blue light.

The light source unit 220 may be disposed to face at least one of the lateral surfaces of the light guide plate 210 to emit light. The light may pass through the light guide plate 210 and used for displaying an image by the liquid crystal display panel 100.

The optical member 230 may be provided between the light guide plate 210 and the liquid crystal display panel 110. The optical member 230 may control light provided by the light source unit 220 and emitted through the light guide plate 210. The optical member 230 may sequentially include a diffusion sheet 236, a prism sheet 234, and a passivation sheet 232.

The diffusion sheet 236 may diffuse light emitted from the light guide plate 210. The prism sheet 234 may collect light diffused by the diffusion sheet 236 in a direction perpendicular to a plane of the liquid crystal display panel 100 at an upper side. Light passing through the prism sheet 234 may be perpendicularly incident to the liquid crystal display panel 100. The passivation sheet 232 may be disposed on the prism sheet 234 and protect the prism sheet 234 from external impact.

According to an exemplary embodiment of the present invention, at least one of the diffusion sheet 236, the prism sheet 234, and the passivation sheet 232 may include overlapping sheets. One of the diffusion sheet 236, the prism sheet 234, and the passivation sheet 232 may be omitted from the optical member 230.

The reflection sheet 240 may be disposed under the light guide plate 210 and reflect the light that travels to a direction other than to the liquid crystal display panel 100 in order to redirect the leaked light to the liquid crystal display panel 100. The reflection sheet 240 may include a light reflecting material. The reflection sheet 240 may be disposed on the lower cover 420 to reflect light generated from the light source unit 220. Accordingly, the reflection sheet 240 may increase an amount of light provided to the liquid crystal display panel 100.

According to an exemplary embodiment of the present invention, the light source unit 220 may be disposed to provide light in the direction of the lower surface of the light guide plate 210. According to an exemplary embodiment of the present invention, the light guide plate 210 may be omitted in the backlight unit 200, and the light source unit 220 may be disposed under the liquid crystal display panel 100, so that light emitted by the light source unit 220 may be directly provided to the liquid crystal display panel 100.

The upper cover 410 may be provided at an upper part of the liquid crystal display panel 100. The upper cover 410 may include a display window 411 for exposing the display area DA of the liquid crystal display panel 100. The upper cover 410 may be coupled with the lower cover 420 to support the liquid crystal display panel 100.

The lower cover 420 may be provided at a lower part of the backlight unit 200. The lower cover 420 may include a space that accommodates the liquid crystal display panel 100 and the backlight unit 200. The lower cover 420 may be coupled with the upper cover 410 to accommodate and support the liquid crystal display panel 100 and the backlight unit 200 in an internal space thereof.

Figure 2:
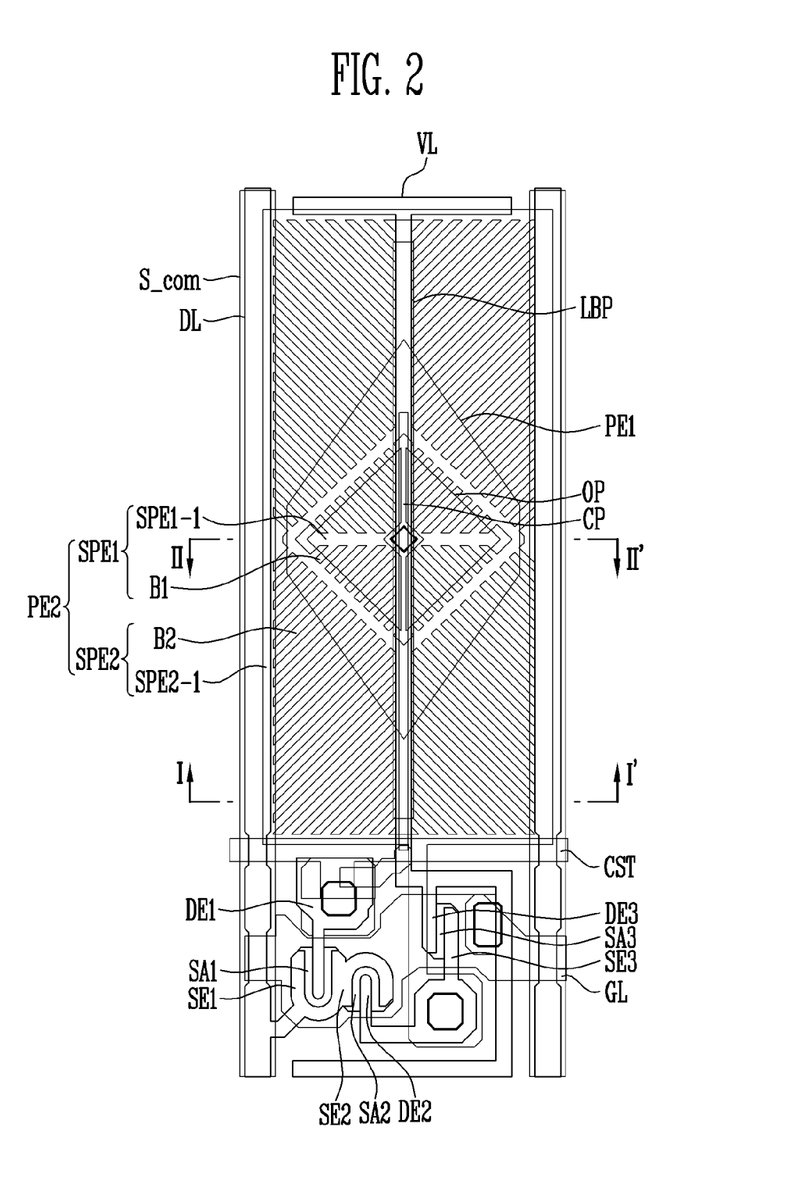
FIG. 2 is a top plane view illustrating a pixel of a liquid crystal display panel illustrated in FIG. 1.
Figure 3:
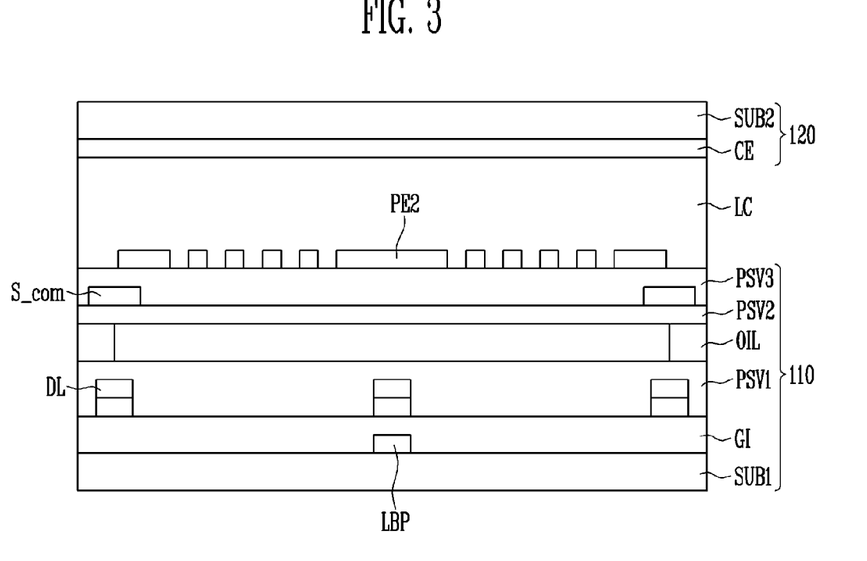
FIG. 3 is a cross-sectional view taken along line I-I' of FIG. 2.
Figure 4:
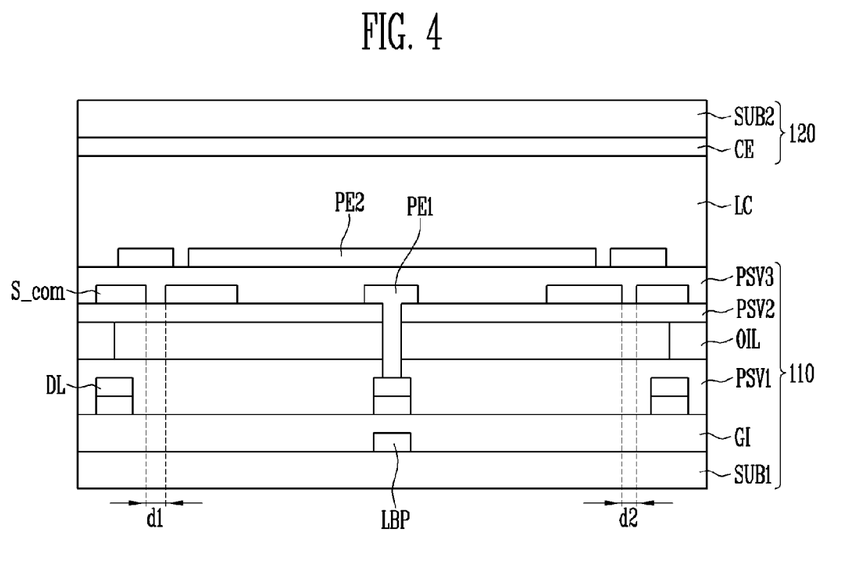
FIG. 4 is a cross-sectional view taken along line II-II' of FIG. 2.

FIG. 2 is a top plane view illustrating a pixel of the liquid crystal display panel illustrated in FIG. 1, FIG. 3 is a cross-sectional view taken along line I-I' of FIG. 2, and FIG. 4 is a cross-sectional view taken along line II-II' of FIG. 2.

Referring to FIG. 2, FIG. 3, and FIG. 4, the liquid crystal display panel may include the first substrate 110, the second substrate 120 opposite to the first substrate 110, and the liquid crystal layer LC formed between the first substrate 110 and the second substrate 120.

The first substrate 110 may be a thin-film transistor array substrate on which thin-film transistors for driving liquid crystal molecules of the liquid crystal layer LC are formed.

The first substrate 110 may include a first base substrate SUB1 having pixel areas. The first base substrate SUB1 may be a rigid type base substrate or a flexible type base substrate. The rigid type base substrate may be one of a glass base substrate, a quartz base substrate, a glass ceramic base substrate, and a crystalline glass base substrate. The flexible type base substrate may be a film base substrate and a plastic base substrate including a polymer organic material. A material applied to the first base substrate SUB1 may have resistance (or heat resistance) to a high processing temperature that occurs during a fabricating process.

Gate lines GL may be disposed on the first base substrate SUB1. The gate line GL may transmit a gate signal and extend in a first direction. Portions of the gate line GL may be first to third gate electrodes (not shown).

A light blocking pattern LBP extending in a second direction may be disposed on the first base substrate SUB1. The second direction may be a crossing direction with respect to the first direction. The light blocking pattern LBP and the gate line GL may include the same material. The light blocking pattern LBP may be electrically insulated from the gate lines GL.

A gate insulating layer GI may be disposed on the gate line GL and the light blocking pattern LBP. The gate insulating layer GI may include at least one of a silicon oxide (SiNx) and a silicon nitride (SiOx).

First to third semiconductor layers SA1, SA2, and SA3 may be disposed on the gate insulating layer GI. An ohmic contact layer (not shown) may be disposed on surfaces of the first to third semiconductor layers SA1, SA2, and SA3.

Data lines DL, a reference voltage line VL, first to third source electrodes SE1, SE2, and SE3, and first to third drain electrodes DE1, DE2, and DE3 may be disposed on the gate insulating layer GI and the first to third semiconductor layers SA1, SA2, and SA3.

The data line DL may extend at one side of each pixel area in the second direction and connected to an external driving circuit.

The reference voltage line VL may extend in the second direction and overlap the light blocking pattern LBP.

A first passivation layer PSV1 may be disposed on the data line DL, the reference voltage lines VL, first to third source electrodes SE1, SE2, and SE3, and first to third drain electrodes DE1, DE2, and DE3. The first passivation layer PSV1 may include at least one of silicon oxide (SiOx), and silicon nitride (SiNx).

An organic insulation layer OIL may be disposed on the first passivation layer PSV1. The organic insulation layer OIL may planarize a surface and include a color filter including pigment. The color filter may have one of red, green, and blue pigment. The color filter may also have one of cyan, magenta, and yellow pigment.

A second passivation layer PSV2 may be disposed on the organic insulation layer OIL. The second passivation layer PSV2 may prevent the organic insulation layer OIL from being exposed. The second passivation layer PSV2 and the first passivation layer PSV1 may include the same material. That is, the second passivation layer PSV2 may include at least one of silicon oxide (SiOx), and silicon nitride (SiNx).

A first pixel electrode PE1 and a shielding electrode S_com may be disposed on the second passivation layer PSV2. The first pixel electrode PE1 and the shielding electrode S_com may include the same material. For example, the first pixel electrode PE1 and the shielding electrode S_com may include a transparent conductive oxide. The transparent conductive oxide may be one of an indium tin oxide (ITO), an indium zinc oxide (IZO), an aluminum zinc oxide (AZO), a gallium doped zinc oxide (GZO), a zinc tin oxide (ZTO), a gallium tin oxide (GTO), and a fluorine doped tin oxide (FTO).

The first pixel electrode PE1 may be connected to the first drain electrode DE through contact holes which pass through the first passivation layer PSV1, the organic insulating layer OIL, and the second passivation layer PSV2.

The first pixel electrode PE1 may have a hexagonal shape. A first side and a second side of the first pixel electrode PE1 may be parallel to one side of the pixel area. A third side and a fourth side may extend from one side of the first side and one side of the second side, and may be inclined to the first side and the second side to be parallel to each other. A fifth side and a sixth side may connect the first side and the second side, and the third side and the fourth side, and are parallel to each other. According to the present exemplary embodiment, the first to sixth sides have the same lengths.

The first pixel electrode PE1 may further include an opened part OP having a diamond shape, and a connection part CP crossing the opened part OP therein. The connection part CP may overlap the reference voltage line VL.

The connection part CP may be connected to the reference voltage line VL through a contact hole passing through the first passivation layer PSV1, the organic insulating layer OIL, and the second passivation layer PSV2.

The shielding electrode S_com may overlap the data line DL and extend in the second direction. The shielding electrode S_com may overlap the data line DL to prevent coupling between the data line DL and the common electrode CE. Accordingly, the shielding electrode S_com may prevent abnormal movement of liquid crystal molecules within the pixel area and increase storage capacitance of the pixel area.

A first distance d1 between the shielding electrode S_com and a first side of the first pixel electrode PE1 that is parallel to the shielding electrode S_com may be greater than a second distance d2 between a second side of the first pixel electrode PE1 and the shielding electrode S_com disposed on the adjacent pixel area, in which the second side is parallel to the shielding electrode S_com of the adjacent pixel area. Here, the first distance d1 may be in a range of 6 μm to 10 μm and the second distance d2 may be in a range of 4 μm to 8 μm.

A ratio of the first distance d1 to the second distance d2 may be in a range of 3:2 to 5:4.

That is, the distances between the shielding electrode S_com and the first pixel electrodes PE1 may be asymmetric. Accordingly, the shielding electrode S_com may block an electric field generated in the data line DL more effectively and prevent abnormal movement of liquid crystal molecules within the pixel area.

A third passivation layer PSV3 may be disposed on the first pixel electrode PE1 and the shielding electrode S_com to cover the first pixel electrode PE1 and the shielding electrode S_com. The third passivation layer PSV3 and the first passivation layer PSV1 may include the same material. That is, the third passivation layer PSV3 may include at least one of a silicon oxide (SiOx), and a silicon nitride (SiNx).

A second pixel electrode PE2 may be disposed on the third passivation layer PSV3. The second pixel electrode PE2 and the first pixel electrode PE1 may include the same material.

The second pixel electrode PE2 may have a plate shape, and may cover most of the pixel areas. The second pixel electrode PE2 may include a first sub-pixel electrode SPE1 having a shape corresponding to that of the opened part OP of the first pixel electrode PE1 that may have a diamond shape, and a second sub-pixel electrode SPE2 disposed at an outer boundary of the first sub-pixel electrode SPE1. The first sub-pixel electrode SPE1 and the second sub-pixel electrode SPE2 may be spaced apart from each other.

An edge area of the first sub-pixel electrode SPE1 may overlap the first pixel electrode PE1. The first sub-pixel electrode SPE1 may have a cross-shaped stem part SPE1-1 including a horizontal stem part and a vertical stem part, and first branch parts B1 extending from the stem part SPE1-1. The first sub-pixel electrode SPE1 may be connected to the first pixel electrode PE1 through a contact hole passing through the third passivation layer PSV3.

The first sub-pixel electrode SPE1 may be divided into four sub-regions by the cross-shaped stem part SPE1-1. The first branch parts B1 may be disposed on the sub-regions. Acute angles formed between the first branch parts B1 and the stem part SPE1-1 may be about 35° to 55°.

An edge area formed within the second sub-pixel electrode SPE2 may overlap the first pixel electrode PE1. The second sub-pixel electrode SPE2 may be disposed at an outer boundary of the first sub-pixel electrode SPE1 to be spaced apart from the first sub pixel electrode SPE1. The second pixel electrode PE2 may be connected to the second drain electrode DE2 through a contact hole which passes through the first passivation layer PSV1, the organic insulating layer OIL, the second passivation layer PSV2, and the third passivation layer PSV3.

The second sub-pixel electrode SPE2 may further include a circumference part SPE2-1 corresponding to each corner of the plate shape and second branch parts B2 extending from the circumference part SPE2-1. Acute angles formed between the second branch parts B2 and the stem part SPE2-1 may be about 35° to 55°.

The second substrate 120 may be an opposing substrate disposed opposite to the first substrate 110. The second substrate 120 may include a second base substrate SUB2 and a common electrode CE.

The second base substrate SUB2 and the first base substrate SUB1 may include the same material.

The common electrode CE may be disposed on the second base substrate SUB2. The common electrode CE may have a plate shape in the pixel area.

The common electrode CE may include the same material as that of the first pixel electrode PE1 and the second pixel electrode PE. That is, the common electrode CE may include a transparent conductive oxide.

An overcoat layer (not shown) may be disposed between the second base substrate SUB2 and the common electrode CE. The overcoat layer may be disposed on a surface of the second base substrate SUB2 that faces the first substrate 110. The overcoat layer may planarize the surface of the second base substrate SUB2.

The liquid crystal layer may include liquid crystal molecules having dielectric anisotropy. The liquid crystal molecules may be arranged between the first substrate 110 and the second substrate 120. For example, the liquid crystal molecules may be vertically aligned liquid crystal molecules, which are arranged in a vertical direction and disposed between the first substrate 110 and the second substrate 120. When an electric field is applied between the first substrate 110 and the second substrate 120, the liquid crystal molecules may rotate in a specific direction between the first substrate 110 and the second substrate 120 to transmit or block light. A direction in which the liquid crystal molecules rotate may be substantially perpendicular to the first substrate 110 or the second substrate 120. Rotation of the liquid crystal molecules may include a change of alignment of the liquid crystal molecules by the electric field, and actual rotation of the liquid crystal molecules.

According to exemplary embodiments of the present invention illustrated above with respect to FIG. 2, FIG. 3, and FIG. 4, a display quality may be improved by preventing a texture phenomenon.

Figure 5:
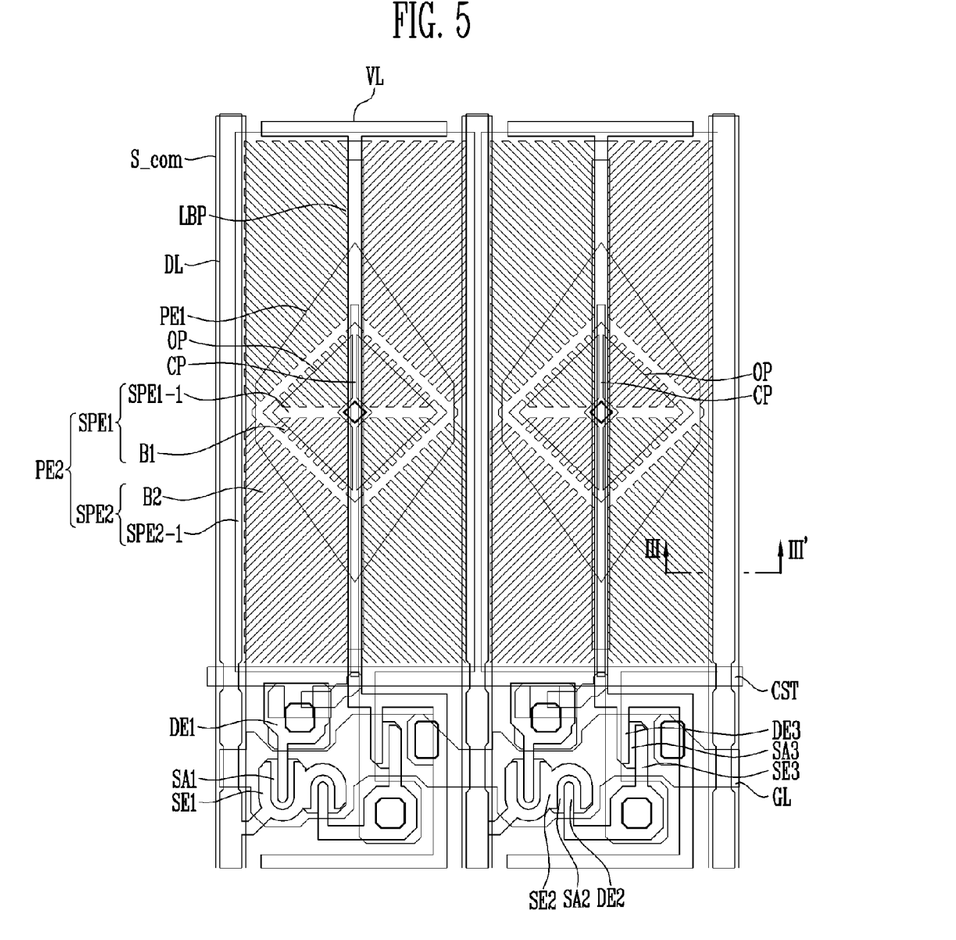
FIG. 5 is a top plane view illustrating a liquid crystal display panel according to an exemplary embodiment of the present invention.
Figure 6:
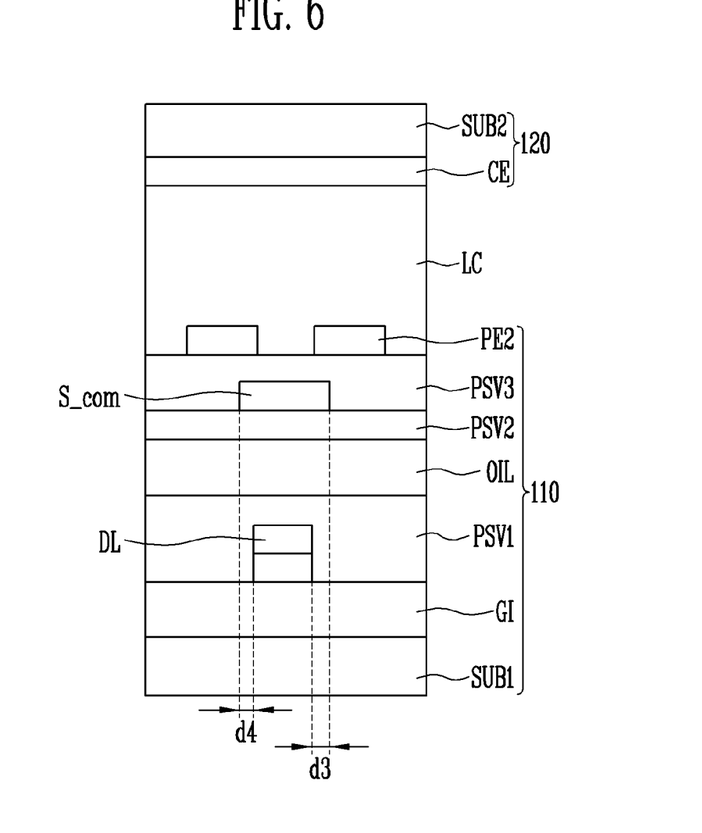
FIG. 6 is a cross-sectional view taken along line III-III' of FIG. 5.

FIG. 5 and FIG. 6 illustrate a liquid crystal display panel according to an exemplary embodiment of the present invention. The liquid crystal display panel of FIGS. 5 and 6 may include elements substantially similar to the liquid crystal display panel illustrated with respect to FIG. 2, FIG. 3, and FIG. 4, and repeated description of the substantially similar elements and operations will be omitted.

FIG. 5 is a top plane view illustrating a liquid crystal display panel according to an exemplary embodiment of the present invention, and FIG. 6 is a cross-sectional view taken along line III-III' of FIG. 5.

Referring to FIGS. 5 to 6, the liquid crystal display panel includes a first substrate 110, a second substrate 120 opposite to the first substrate 110, and the liquid crystal layer LC disposed between the two substrates 110 and 120.

The first substrate 110 may include a first base substrate SUB1 including pixel areas.

Gate lines GL and data lines DL crossing each other may be disposed on the first base substrate SUB1. The gate line GL and the data line DL may be connected with thin-film transistors.

A first passivation layer PSV1 may be disposed on the data line DL and the thin-film transistors, and an organic insulation layer OIL may be disposed on the first passivation layer PSV1. A second passivation layer PSV2 may be disposed on the organic insulation layer OIL.

A first pixel electrode PE1 and a shielding electrode S_com may be disposed on the second passivation layer PSV2.

The shielding electrode S_com may overlap the data line DL and extend in the second direction. The shielding electrode S_com may overlap the data line DL to prevent coupling between the data line DL and the common electrode CE. Accordingly, the shielding electrode S_com may prevent abnormal movement of liquid crystal molecules within the pixel area and increase storage capacitance of the pixel area.

A width of the shielding electrode S_com may be greater than a width of the data line DL. Among portions of the shielding electrode S_com that do not overlap the data line DL, a first width d3 of the shielding electrode S_com corresponding to a portion of the shielding electrode S_com disposed on the pixel area may be greater than a second width d4 of the shielding electrode S_com corresponding to a portion of the shielding electrode S-com disposed on an adjacent pixel area. That is, a center line of the shielding electrode S_com may not overlap a center line of the data line DL. Further, the center line of the data line DL may be inclined to the adjacent pixel area, and the shielding electrode S_com may overlap the data line DL.

The first width d3 of the shielding electrode S_com in the direction of the pixel area may be in a range of 2.5 μm to 3.5 μm, and the second width d4 the shielding electrode S_com in the direction of the adjacent pixel area may be in a range of 1.5 μm to 2.5 μm. A ratio of the first width d3 to the second width d4 may be in a range of 5:3 to 7:5.

The shielding electrode S_com and the data line DL may asymmetrically overlap. Accordingly, the shielding electrode S_com may block an electric field generated in the data line DL more effectively. Accordingly, the shielding electrode S_com may prevent abnormal movement of liquid crystal molecules within the pixel area.

A third passivation layer PSV3 may be disposed on the first pixel electrode PE1 and the shielding electrode S_com. A second pixel electrode PE2 may be disposed on the third passivation layer PSV3.

The second substrate 120 may be an opposing substrate disposed opposite to the first substrate 110. The second substrate 120 may include a second base substrate SUB2 and a common electrode CE.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A display device, comprising:
a first substrate comprising pixel areas;
a second substrate comprising a common electrode, the second substrate facing the first substrate; and
a liquid crystal layer disposed between the first substrate and the second substrate,
wherein:
the first substrate comprises:
data lines disposed on a side of each pixel area;
a first pixel electrode comprising a hexagonal shape disposed on the pixel areas;
a shielding electrode overlapping the data line, the shielding electrode disposed on the same layer as the first pixel electrode; and
a second pixel electrode disposed on the first pixel electrode; and
a first distance between the shielding electrode and a first side of the first pixel electrode disposed on a first pixel area of the pixel areas is greater than a second distance between a second side of the first pixel electrode and the shielding electrode disposed on a second pixel area of the pixel areas.

2. The display device of claim 1, wherein:
the first distance is in a range of 6 μm to 10 μm; and
the second distance is in a range of 4 μm to 8 μm.

3. The display device of claim 2, wherein a ratio of the first distance to the second distance is in a range of 3:2 to 5:4.

4. The display device of claim 3, wherein a width of the shielding electrode is greater than a width of the data line.

5. The display device of claim 4, wherein the first pixel electrode comprises an opened part comprising a diamond shape.

6. The display device of claim 5, wherein the second pixel electrode comprises:
a first sub-pixel electrode overlapping the opened part of the first pixel electrode; and
a second sub-pixel electrode spaced apart from outer boundaries of the first sub-pixel electrode, the second sub-pixel electrode comprising a plate shape covering the pixel areas.

7. The display device of claim 6, wherein an edge area of the first sub-pixel electrode overlaps the first pixel electrode.

8. The display device of claim 7, wherein:
the first sub-pixel electrode comprises:
a stem part comprising a cross shape; and
first branch parts extending from the stem part; and acute angles formed between the stem part and the first branch parts are in a range of 35° to 55°.

9. The display device of claim 8, wherein an edge area formed within the second sub-pixel electrode overlaps the first pixel electrode.

10. The display device of claim 9, wherein the second sub-pixel electrode comprises:
a circumference part connecting outer corners of the second sub-pixel electrode having the plate shape; and
second branch parts extending from the circumference part.

11. The display device of claim 10, wherein angles formed between the second branch parts and the circumference part are in a range of 35° to 55°.

12. A display device, comprising:
a first substrate comprising pixel areas;
a second substrate comprising a common electrode, the second substrate facing the first substrate; and
a liquid crystal layer disposed between the first substrate and the second substrate,
wherein:
the first substrate comprises:
gate lines disposed on a first base substrate;
data lines insulated from and crossing the gate lines;
thin-film transistors connected to the gate lines and the data lines;
a first passivation layer disposed on the thin-film transistors;
a first pixel electrode disposed on the first passivation layer and connected to a first thin-film transistor of the thin-film transistors;
a shielding electrode disposed on the first passivation layer and overlapping the data line, the shielding electrode being configured to block an electric field;
a second passivation layer disposed to cover the first pixel electrode and the shielding electrode; and
a second pixel electrode disposed on the second passivation layer, the second pixel electrode comprising:
a first sub-pixel electrode overlapping an opened part of the first pixel electrode; and
a second sub-pixel electrode disposed at outer boundaries of the first sub-pixel electrode, the second sub-pixel electrode is connected to a second thin-film transistor of the thin-film transistors; and
a first distance between the shielding electrode and a first side of the first pixel electrode disposed on a first pixel area of the pixel areas is greater than a second distance between a second side of the first pixel electrode and the shielding electrode disposed on a second pixel area of the pixel areas.

13. The display device of claim 12, wherein:
the first distance is in a range of 6 µm to 10 µm; and
the second distance is in a range of 4 µm to 8 µm.

14. A display device, comprising:
a first substrate comprising pixel areas;
a second substrate comprising a common electrode, the second substrate facing the first substrate; and
a liquid crystal layer disposed between the first substrate and the second substrate,
wherein:
the first substrate comprises:
data lines disposed on a side of each pixel area;
a first pixel electrode comprising a hexagonal shape disposed on the pixel areas;
a shielding electrode overlapping the data line, the shielding electrode disposed on the same layer as the first pixel electrode; and
a second pixel electrode disposed on the first pixel electrode;
a width of the shielding electrode is greater than a width of the data line; and
a first width and a second width which correspond to portions of the shielding electrode is that do not overlap the data line are configured to be different from each other.

15. The display device of claim 14, wherein:
a first portion of the shielding electrode corresponding to the first width is disposed on a first pixel area of the pixel areas;
a second portion of the shielding electrode corresponding to the second width is disposed on a second pixel area of the pixel areas; and
the first width is greater than the second width.

16. The display device of claim 15, wherein:
the first width is in a range of 2.5 µm to 3.5 µm; and
the second width is in a range of 1.5 µm to 2.5 µm.

17. The display device of claim 16, wherein a ratio of the first width to the second width is in a range of 5:3 to 7:5.

18. The display device of claim 17, wherein a width at which the shielding electrode overlaps the second pixel electrode is greater than a width of a second electrode overlapping the shielding electrode in the second pixel area of the pixel areas.

19. A display device, comprising:
a first substrate comprising pixel areas;
a second substrate comprising a common electrode, the second substrate facing the first substrate; and
a liquid crystal layer disposed between the first substrate and the second substrate,
wherein:
the first substrate comprises:
gate lines disposed on a first base substrate;
data lines insulated from and crossing the gate lines;
thin-film transistors connected to the gate lines and the data lines;
a first passivation layer disposed on the thin-film transistors;
a first pixel electrode disposed on the first passivation layer and connected to a first thin-film transistor of the thin-film transistors;
a shielding electrode disposed on the first passivation layer and overlapping the data line, the shielding electrode being configured to block an electric field;
a second passivation layer disposed to cover the first pixel electrode and the shielding electrode; and
a second pixel electrode disposed on the second passivation layer, the second pixel electrode comprising:
a first sub-pixel electrode overlapping an opened part of the first pixel electrode; and
a second sub-pixel electrode disposed at outer boundaries of the first sub-pixel electrode, the second sub-pixel electrode is connected to a second thin-film transistor of the thin-film transistors;
a width of the shielding electrode is greater than a width of the data line; and
a first width and a second width which correspond to portions of the shielding electrode that do not overlap the data line are configured to be different from each other.

20. The display device of claim 19, wherein:
a first portion of the shielding electrode corresponding to the first width is disposed on a first pixel area of the pixel areas;
a second portion of the shielding electrode corresponding to the second width is disposed on a second pixel area of the pixel areas; and
the first width is greater than the second width.

* * * * *